United States Patent [19]

Risse

[11] 4,048,113

[45] Sept. 13, 1977

[54] CATALYTIC COMBUSTION MASS

[75] Inventor: Roger Paul Pierre Risse, Caluire, France

[73] Assignee: Societe Lyonnaise des Applications Catalytiques S.A., Rillieux, La Pape, France

[21] Appl. No.: 624,469

[22] Filed: Oct. 21, 1975

[30] Foreign Application Priority Data

Oct. 21, 1974 France ............................... 74.40568

[51] Int. Cl.$^2$ ........................ B01J 21/04; B01J 23/10; B01J 23/26; B01J 23/42
[52] U.S. Cl. .................................. 252/462; 252/465; 252/466 PT; 252/477 R; 431/328
[58] Field of Search .................. 252/477 R, 462, 465, 252/466 PT; 423/213.5; 431/328

[56] References Cited

U.S. PATENT DOCUMENTS

| 3,397,154 | 8/1968 | Talsma | 252/463 |
|---|---|---|---|
| 3,441,359 | 4/1969 | Keith et al. | 431/328 |
| 3,560,408 | 2/1971 | Kiehl et al. | 252/477 R |
| 3,632,709 | 1/1972 | Hayes et al. | 252/477 R |
| 3,697,447 | 10/1972 | Bettinardi | 431/328 X |
| 3,741,725 | 6/1973 | Graham | 423/213.5 |
| 3,843,561 | 10/1974 | Sobel | 252/477 R |

Primary Examiner—W. J. Shine
Attorney, Agent, or Firm—Karl F. Ross

[57] ABSTRACT

Contact mass for heterogeneous catalysis, characterized in that it comprises a support of alumina fibers having a large specific surface and good thermal stability, on which is deposited a catalyst comprising at least one element chosen from metals of crude platinum belonging to group VIII of the periodic table of elements, a gas supply device being provided which allows appropriate distribution of the combustible gas.

6 Claims, 1 Drawing Figure

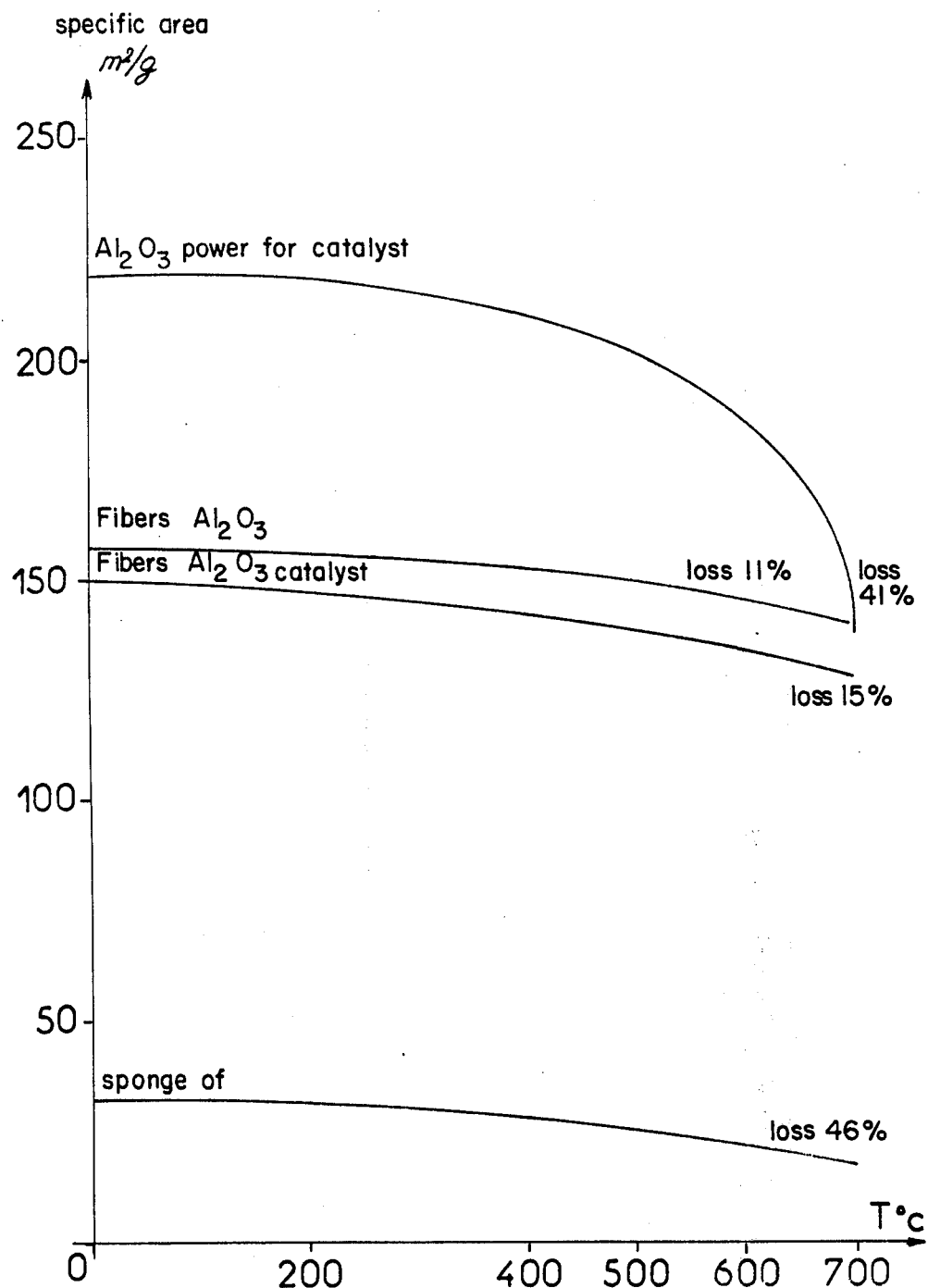

CATALYTIC COMBUSTION MASS

The present invention relates to a contact mass for heterogeneous catalysis, more specifically intended for the catalytic oxidation of methane.

Numerous publications indicate the possibility of carrying out a catalytic oxidation reaction of natural gas (methane) in conditions which are as good as for the catalytic oxidation of other hydrocarbons such as butane, propane or petrol. In practice, the catalytic combustion of methane is difficult to carry out and does not achieve the quality of combustion currently obtained with propane or butane for example. All attempts known hitherto to produce catalytic masses for the oxidation of methane have produced apparatus having a mediocre operability and unsuitable for domestic use.

Catalyst supports generally used for producing contact masses heated by catalysis, are of mineral origin. The following are thus used, asbestos in all its forms, silica in the form of fibers (as described in French Patent No. 1,505,615 in the name of the Applicant), alumina in the form of powder (as described in French Patent Application No. 73 19 582 in the name of the Applicant and in French Patent No. 1 367 925) and all synthetic fibers of silico-aluminous origin. These mineral substances all have, to varying degrees, good chemical and mechanical resistance to the normal operating temperatures of catalytic masses but have a relatively small specific surface area, apart from powdered alumina. Furthermore, the specific surface area of these substances frequently decreases considerably after several hours of operation at relatively moderate temperatures. This phenomenon is due to a crystalline rearrangement of the structure of the material. Now it is well known that during heterogeneous catalysis, the active surface provided for the reactants must be considerable, but also stable at the temperature of the reaction. This condition is of prime importance in the case of catalytic combustion of methane.

The difficulties encountered in the catalytic combustion of methane are due to two main reasons:

the first, of chemical nature, is the great stability of the molecule of methane which, due to this, is ill-suited to all reactions of degradation or substitution, if powerful means are not used. Thus, on a traditional catalytic mass, such as platinum sponge, the combustion reaction of methane begins solely in the range of 300° to 400° C, even 500° C according to certain authorities, and is only complete at a temperature of the order of 800° to 900° C, the second, of a physical nature, is due to the low density of methane and consequently, to its low volumetric heating power. This latter property means that traditional contact masses are ill-suited to the combustion of natural gas or methane and one thus ascertains the appearance of preferential regions of passage of the gas accompanied by an imbalance of the surface temperatures of the contact mass.

Under these conditions, the combustion efficiencies are low and do not exceed 0.6 to 0.8.

The object of the present invention is to remedy these drawbacks by providing a contact mass for heterogeneous catalysis, more specifically intended for the combustion of methane, comprising a support of alumina fibers having a large specific surface area and good thermal stability, on which is deposited a catalyst comprising at least one element chosen from metals of crude platinum belonging to group VIII of the periodic classification of elements, a gas supply device being provided, which allows an appropriate distribution of the combustible gas.

BRIEF DESCRIPTION OF THE DRAWING

The drawing is a graph illustrating the comparative loss of surface effectivity of the system of the present invention and other catalyst supports.

SPECIFIC DESCRIPTION OF THE DRAWING

In the drawing the specific surface area in $m^2$/gram of various catalyst supports is plotted along the ordinate against temperature plotted along the abscissa. The upper curve shows alumina powder impregnated with catalyst to suffer a loss of effective surface area of 41% upon heating to a temperature of 700° C. The next lower curve represents the fibers in accordance with the invention showing a loss of only 11% in effective surface area upon such hearing. The third curve from the top indicates the characteristics of the catalyst mass of the invention, consisting of fibers impregnated with catalyst and indicating a loss of 15% in effective surface area upon heating to 700° C. The lower curve shows the characteristics of platinum sponge upon similar heating.

The alumina fibers constituting the support must have a mean diameter of the order of 3 microns and have a minimum specific surface of between 120 and 150$m^2$/g, their thermal stability being such that for temperatures of the order of 600° to 700° C, the reduction of their specific surface area is very slight. These fibers are advantageously arranged in a sheet, the thickness of which is between 5 and 20mm and preferably between 10 and 15mm. The accompanying diagram shows that with such a support, at 700° C, one ascertains a decrease of specific surface area of solely 11 to 15%. By way of comparison, powdered alumina, whose grain size is between several microns and 30 to 40 microns undergoes a reduction of 41% of its specific surface, at the same temperature.

Although tests have shown that the specific surfaces of powdered alumina and alumina in the form of fibers are similar after a treatment at a temperature of 700° C, it seems preferable to use alumina in the form of fibres as the support. In fact, the considerable crystalline transformation undergone by powdered alumina is translated during use by a substantial reduction in catalytic activity, which is unacceptable in the case of the combustion of methane. Furthermore, the maximum mass of powdered alumina used in the production of a contact mass is necessarily, for technical reasons, much less than the mass of alumina in the form of fibers necessary for the production of the same contact mass, the mass ratio being between 0.1 and 0.2.

The catalyst used in the composition of the contact mass comprises at least one element chosen from metals of crude platinum belonging to groups VIII$b$ or VIII$c$ of the periodic table of elements. This element, which is advantageously platinum or palladium, may be associated with other elements of group VIII or group VI, such as chromium, or even of the group of rare earths such as cerium.

At the time of its deposit, this catalyst is preferably associated with a re-crystallization inhibitor constituted by an element having a high electronic density chosen from the heavy elements of period 7 of the periodic table, such as thorium.

The catalytic mass according to the invention advantageously comprises a mixture of platinum and chromium associated with a re-crystallization inhibitor constituted by thorium.

The constituent elements of the catalyst and re-crystallization inhibitor are mixed in the form of salts in a single solution. This solution is deposited on the alumina fibers in order to impregnate them thoroughly, after which drying of the latter and heating in an oven takes place. After heating in an oven, the fibers are subject to a thermal treatment in an oxidizing atmosphere in order to obtain in an active form, the elements and oxides of salts deposited on the latter.

The proportions of catalyst in the contact mass are between 1 and 5% and preferably, between 1.5 and 2.5%, the re-crystallisation inhibitor being present in the latter in the same proportions. A catalyst of this type and its support are capable of carrying out the oxidation reaction of methane inter alia, up to the end product, i.e. without the formation of intermediate or partial oxidation compounds, such as acids and aldehydes, with yields approaching 100%. However, high yields are obtained solely if the distribution of the combustible gas is carried out appropriately. The absorption capacity of the contact mass for natural gas for example should correspond to overall spatial speeds of between 100 and 160.

The distribution of combustible gas coming into contact with the active mass, depending on the geometry of the latter, should be either uniform or vary to a greater or lesser extent in order to permanently maintain a fuel/supporter of combustion ratio capable of producing complete combustion with good efficiency.

Thus, for a given geometry of the catalytic mass, the gas pressure may vary within proportions corresponding to spatial speeds of between 80 and 240 according to the regions in question, while retaining a mean spatial speed of the order of 160. This gas supply system may be constituted:

firstly, by a layer of permeable mineral wool or any other homogeneous porous body produced from a noble material, free of elements or compounds such as iron and its oxides, which are able to create secondary reactions and capable of withstanding a surface temperature at least 500° C, this layer being located in contact with the active mass and upstream of the latter, in the gas supply pipe, and secondly, by partitioning the empty space located between the diffuser and the base of the metal casing receiving the active mass/diffusion layer arrangement.

The permeable layer may advantageously be constituted by silico-aluminous fibers. The partitioning, varying according to the type of gas, is firstly intended to create a gaseous flow whose characteristics are dependent on the physical characteristics of the combustible gas in question and in particular on its density. The gaseous flow thus created is then diffused on the active mass by means of the diffusion layer of mineral wool. Likewise, for reasons of combustion efficiency, the partitioning may have various constructions dependent on the geometry of the active mass and the metal casing or heating body.

The distribution of the gas pressure of the active mass may vary for each type of gas and be essentially dependent on the density of the gas in question.

This contact mass as well as its supply system find a particularly advantageous application in gas heating appliances provided with safety members and control members of known type.

SPECIFIC EXAMPLE

A mass of alumina fibers having a mean diameter of 3 microns and a minimum specific surface of 135 m$^2$/g are provided in a sheet having a thickness of 12 mm and is coated with a catalyst substance consisting of platinum in an amount of 1.0% by weight of the total catalyst mass (including the support), chromium in an amount of 0.5% by weight of the total mass and thorium in an amount of 0.2% by weight of the mass. The thorium, chromium and platinum compounds are deposited on the fibers from solutions of the corresponding nitrates, the solution-coated fibers being dried and subjected to heating in an oxidizing atmosphere. It is believed that the metals are present in the form of respective oxides.

The catalyst mass is capable of producing the complete combustion of hydrocarbons, i.e. a combustion efficiency of close to unity at a temperature of about 700° C, the conversion of the methane being about 100%. The combustion product is found to be free from acids and aldehydes and, with a spatial speed of the order of 160, it is found that practically all of the carbon and hydrogen in natural gas are converted to carbon dioxide and water vapor. Generally speaking catalysts of the type set out in my copending application Ser. No. 471,752 filed 20 May 1974, and now abandoned may be used.

I claim:
1. A contact mass for heterogeneous catalysts which comprises:
    a sheet having a thickness of 5 to 20 mm of alumina fibers of a mean diameter of the order of 3 microns with a specific surface area of about 120 to 150 m$^2$/g and having a decrease in specific surface area of only 11 to 15% upon heating to 700° C
    a coating of platinum catalyst on said fibers;
    a layer of mineral wool in contact with said sheet and capable of withstanding a surface temperature of at least 500° C.
2. The contact mass defined in claim 1 wherein the sheet of alumina fibers has a thickness of 10 to 15 mm.
3. The contact mass defined in claim 1 wherein the coating further comprises chromium catalyst.
4. The contact mass defined in claim 1 wherein the coating further comprises cerium catalyst.
5. The contact mass defined in claim 1 wherein the coating further comprises thorium as a recrystallization inhibitor.
6. A contact mass for heterogeneous catalysts which comprises:
    a sheet having a thickness of 5 to 20 mm of alumina fibers of a mean diameter of the order of 3 microns with a specific surface area of about 120 to 150 m$^2$/g and having a decrease in specific surface area of only 11 to 15% upon heating to 700° C;
    a coating of a catalyst of a platinum group metal on said fibers;
    a layer of mineral wool in contact with said sheet and capable of withstanding a surface temperature of at least 500° C.

* * * * *